3,394,012
// METHOD OF PREPARING A DEHYDRATED
// SWEETPOTATO PRODUCT

Stanley P. Koltun, Metairie, and Emile J. McCourtney and James J. Spadaro, New Orleans, La., assignors to the United States of America as represented by the Secretary of Agriculture
No Drawing. Filed June 2, 1965, Ser. No. 460,874
5 Claims. (Cl. 99—207)

ABSTRACT OF THE DISCLOSURE

A process for the preparation of a dehydrated sweetpotato product in which process the conventional peeling operation is eliminated.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to a method of preparing a dehydrated potato product from natural potatoes. More specifically, it relates to a method for producing a dehydrated sweetpotato product from raw sweetpotatoes. Still more specifically, it deals with the preparation of a dehydrated sweetpotato product in which the conventional peeling operation is eliminated.

It is well known that in the process of preserving foods, or in the preparation of so-called "convenience" foods from natural (raw) food-products which have a peel (peeling), this peel must be removed. This is usually done before the cooking operation. Formerly, hand peeling was practiced but because of its high cost, present commercial procedures employ one or more of the following methods: (a) steaming; (b) the use of 20 to 25% aqueous alkaline solutions, such as lye, at temperatures of about 215° to 220° F.; or (c) some method of abrasion. When sweetpotatoes are the natural (raw) food being processed, peeling prior to cooking is usually done, because the cooked sweetpotato would be too soft to permit steam, lye, or abrasive peeling after cooking.

There are a number of disadvantages inherent with any form of chemical or mechanical method of removing peel. Additional equipment, of course, must be used. For steam peeling, the equipment ordinarily consists of a peeler, high-pressure steam equipment, and a washer. For lye peeling, the equipment might consist of a peeler, lye-storage tank, steam regulating equipment, and a washer. For abrasion peeling, some form of abrasion equipment, and a washer for removing the abraded portions which cling to the abraded surfaces, is required. Other factors to be considered are the cost of the lye, the problem of disposing of the used lye solution, the cost of the steam, the safety factors attendant to both methods, and particularly, the greatly reduced yield resulting from the removal of a certain amount of edible sweetpotato along with the peel.

Once the peel has been removed, the sweetpotato becomes highly susceptible to discoloration, particularly in the area of the cambium. One theory is that the temperature of the lye is sufficient to activate the catechol oxidase present which, in turn, is responsible for the discoloration. The use of a chemical, such as sodium sulfite or sodium bisulfite, then becomes necessary to arrest this discoloration. Therefore, avoiding the peeling operation at this point would prevent discoloration, either by enzymatic activity or by oxidation, reduce equipment and utility costs, reduce labor requirements, and eliminate lye and other chemical costs. Most important, the loss of nutrients is decreased and the yield of edible material is increased.

In carrying out the process of the invention, washed sweetpotatoes are mechanically strip-cut to provide strips approximately 0.32" wide and 0.125" thick. These strips are discharged with only a small portion of peel per strip. The strips are then cooked in the presence of moisture for a period of from about 10 to 20 minutes at a temperature of about 212° F. The cooked sweetpotato strips are then mechanically mixed with a sufficient quantity of water to produce a mixture having a solids content of from about 18 to 25 weight percent. This mixture is then fed slowly into a pulper, wherein the peeling and fiber are separated from the pulp, or puree, by a screen section having a mesh size of about 0.045" to 0.125". The pulped (pureed) product, with peel and fiber removed, is then dehydrated to a moisture content of from about 2 to 4 weight percent.

The following example is illustrative of one aspect of the invention: The raw sweetpotatoes are washed and trimmed very lightly; i.e., the ends are removed and any bad or soft spots are cut out. The washed and trimmed sweetpotatoes are then strip-cut into strips of about 0.125" to 0.32". These strips are then added to a kettle containing boiling water, the amount being necessary to adjust the solids content of the sweetpotatoes to about 20 weight percent. Cooking time for this mixture is about 10 minutes, after which the cooked sweetpotatoes are mixed and fed slowly into the pulper. During passage through the pulper, the peel and fiber are separated from the edible portion of the solids. The peel and fiber are then separated from the pulp by passing the cooked product through a metallic screen. We prefer to use a screen having a mesh size of about 0.045" and have found that such a screen is optimum for discharging the bits of peel and fiber from the pulper. The resultant discharged puree is free from peeling or fiber.

It is a critical feature of the process of our invention that the pulper be a "finisher-type" pulper which has a secondary discharge opening for the peel-fiber portion of the cooked product. Pulpers of this type are known to those skilled in the art.

The sweetpotato puree (pulp) is then pumped onto a double-drum dryer for dehydration. The drums are heated with steam at a gage pressure of approximately 75 pounds per square inch (p.s.i.g.) and the clearance between the two drums is adjusted to approximately 0.010 inch when the drums are hot; the retention, or residence time, of the puree on the drum is about 17 seconds, during which time an orange-colored, crepe paper-like sheet of dried sweetpotato product is formed. The moisture content of this sheet is about 2 to 4 weight percent and the product is commercially acceptable.

Alternatively, the washed sweetpotatoes may be preheated in water at about 160° F. for about 30 minutes prior to trimming. After trimming, they are strip-cut and processed as above. We believe that this time-temperature treatment is responsible for some conversion of starch to sugar, as the preheated sweetpotatoes have a sweeter flavor than similar raw products which have not been preheated. The pretreatment (preheating) also causes the dehydrated product to have a darker orange color and a higher bulk density.

In another method of processing, the washed sweetpotatoes are baked at about 450° F. for about 20 minutes. They are then strip-cut to approximately 0.32" x 0.375". These strips are then mixed with a sufficient quantity of water to produce a mixture having a solids content of from about 18 to 25 weight percent, after which they are pulped and dehydrated as above.

We believe that baking the sweetpotatoes hardens the peel and causes some degree of separation of the peel. Both of these factors aid in removing the peel during the pulping operation.

In still another method of processing, the washed sweetpotatoes are cooked in an aqueous salt sodium containing approximately 20 weight percent sodium chloride for about 30 minutes. The cooking temperature may vary from about 210° to 230° F., depending upon the amount of salt present in the solution. The sweetpotatoes are then washed to remove any salt that may be present on the peeling. They are then strip-cut to approximately 0.32″ x 0.375″, and the strips mixed with a sufficient quantity of water to produce a mixture having a solids content of from about 18 to 25 weight percent after which they are pulped, the peel and fiber removed by screening in the pulper, and the screened puree dried as above. We believe that cooking the sweetpotatoes in a fairly concentrated sodium chloride solution has a tanning effect on the peeling and contributes to the separation of the peel. These factors aid considerably in removing the peel during the pulping operation.

It is within the scope of our invention to add one weight percent sodium iodide to the saline solution, prior to the cooking step. This is particularly beneficial in those areas of the country where goiter is prevalent due to a lack of natural iodides.

It is an advantage of the process of our invention that the elimination of the peeling operation greatly increases the yield of edible sweetpotato, thereby reducing the waste and the overall expense of the operation.

It is a further advantage that the peel remains attached to the sweetpotato solids during the cooking step thereby minimizing the tendency for the solids to darken due to exposure to air with attendant oxidation.

It is a still further advantage that elimination of lye during peeling decreases the tendency for the solids to darken and also eliminates the necessity of further chemical treatment by alkali sulfite or bisulfite. Further, and perhaps most important, the off-taste which may be imparted to the sweetpotatoes by treatment of 20–25 weight percent concentrations of lye at 220° to 225° F. is eliminated. These and other advantages are readily apparent to those skilled in the art.

We claim:

1. A process for preparing a dehydrated sweetpotato product useful as a "convenience" food from raw sweetpotatoes wherein peeling is eliminated, which process comprises the steps:
    (a) washing the raw sweetpotatoes;
    (b) preheating the washed, raw sweetpotatoes in water at about 160° F. for about 30 minutes and trimming the thus-preheated washed sweetpotatoes;
    (c) strip-cutting the trimmed sweetpotatoes into strips of about 0.125″ to 0.32″;
    (d) cooling the strips in the presence of moisture;
    (e) mixing the cooked sweetpotato with water to give a solids content of about 18 to 25 weight percent;
    (f) separating the peel and fiber from the cooked sweetpotato by pulping;
    (g) removing the separated peel and fiber from the edible pulp;
    (h) dehydrating the peel- and fiber-free pulp to a moisture content of from about 2 to 4 weight percent; and
    (i) recovering the dehydrated sweetpotato product.

2. A process for preparing a dehydrated sweetpotato product useful as a "convenience" food from raw sweetpotatoes wherein the peeling is eliminated, which process comprises the steps:
    (a) washing the raw sweetpotatoes;
    (b) baking the washed sweetpotatoes at a temperature of about 450° F. for about 20 minutes;
    (c) strip-cutting the baked sweetpotatoes;
    (d) mixing the strip-cut sweetpotato with water to give a solids content of from about 18 to 25 weight percent solids;
    (e) pulping the solids to separate the peel and fiber from the pulp;
    (f) removing the separated peel and fiber from the edible pulp;
    (g) dehydrating the peel- and fiber-free pulp to a moisture content of from about 2 to 4 weight percent; and
    (h) recovering the dehydrated sweetpotato product.

3. A process for preparing a dehydrated sweetpotato product useful as a "convenience" food from raw sweetpotatoes wherein peeling is eliminated, which process comprises the steps:
    (a) washing the raw sweetpotatoes;
    (b) cooking the washed sweetpotatoes in an aqueous solution of a salt selected from the group consisting of sodium chloride and sodium iodide at a temperature of from about 210° to about 230° F. for about 30 minutes;
    (c) removing surface salt by washing in water;
    (d) strip-cutting the cooked and washed sweetpotatoes;
    (e) mixing the strip-cut sweetpotatoes with water to give a solids content of from about 18 to 25 weight percent solids;
    (f) pulping the solids to separate the peel and fiber from the pulp;
    (g) removing the separated peel and fiber from the edible pulp;
    (h) dehydrating the peel- and fiber-free pulp to a moisture content from about 2 to 4 weight percent; and
    (i) recovering the dehydrated sweetpotato product.

4. A process according to claim 3 wherein the salt is sodium chloride and the concentration is about 20 weight percent on the weight of the solution.

5. A process according to claim 3 wherein the salt is sodium iodide and the concentration is about one weight percent on the weight of the solution.

References Cited

UNITED STATES PATENTS

| | | | |
|---|---|---|---|
| 310,927 | 1/1885 | Whitcomb | 99—207 |
| 3,046,145 | 7/1962 | Deobald et al. | 99—207 |
| 3,169,876 | 2/1965 | Hoover | 99—207 |
| 3,261,695 | 7/1966 | Sienkiewicz et al. | 99—207 |

A. LOUIS MONACELL, *Primary Examiner.*

D. M. NAFF, *Assistant Examiner.*